United States Patent [19]

Given, Jr.

[11] 4,434,855
[45] Mar. 6, 1984

[54] SPRINKLER VALVE

[75] Inventor: George R. Given, Jr., Fredericksburg, Va.

[73] Assignee: The United States of America as represented by the Secretary of the Navy, Washington, D.C.

[21] Appl. No.: 363,692

[22] Filed: Mar. 30, 1982

[51] Int. Cl.³ .............................................. A62C 37/08
[52] U.S. Cl. ........................................ 169/37; 169/90
[58] Field of Search ................. 169/37, 90, 41, 42, 169/38, 56, 23, 75

[56] References Cited

U.S. PATENT DOCUMENTS

| | | | |
|---|---|---|---|
| 3,848,676 | 11/1974 | Doherty, Jr. | 169/37 |
| 3,874,455 | 4/1975 | Klesow | 169/37 |
| 4,091,872 | 5/1978 | Mountford | 169/37 |
| 4,099,573 | 7/1978 | Sahara | 169/37 |

FOREIGN PATENT DOCUMENTS 6400053 3/1967 Fed. Rep. of Germany ........ 169/37

Primary Examiner—Joseph J. Rolla
Assistant Examiner—Kenneth Noland
Attorney, Agent, or Firm—R. F. Beers; W. R. Henderson; D. J. Breh

[57] ABSTRACT

A valve for pressurized, liquid sprinkler systems which is adapted for flow testing of the valve without activating the sprinkler system. The valve is constructed with a valve body having a fluid inlet and a fluid outlet connected by a flow passage. The fluid inlet is provided with a supply of pressurized fire extinguishing medium. A cylinder is positioned in the flow passage with a piston slidingly mounted in the cylinder so as to form a chamber with the cylinder. The chamber is pressurized by a sensor-controlled fluid pressure line and controls the position of the piston in the cylinder to open or close the inlet. Pressure in the chamber positions the piston so as to close the fluid inlet. A stem is mounted in the outlet so as to project into the flow passage and through the cylinder to the piston. The stem is attached to the piston on a first end and provided on the other end with a stem extension which projects out of the outlet to a position external to the valve. A liquid deflector and an attacment for a force gauge are positioned on the stem extension. The sprinkler valve can be tested for flow by securing the fire extinguishing medium and control fluid pressure and exerting a mechanical force on the stem extension to withdraw the piston from the fluid inlet to allow fluid flow through the valve.

3 Claims, 3 Drawing Figures

CLOSED

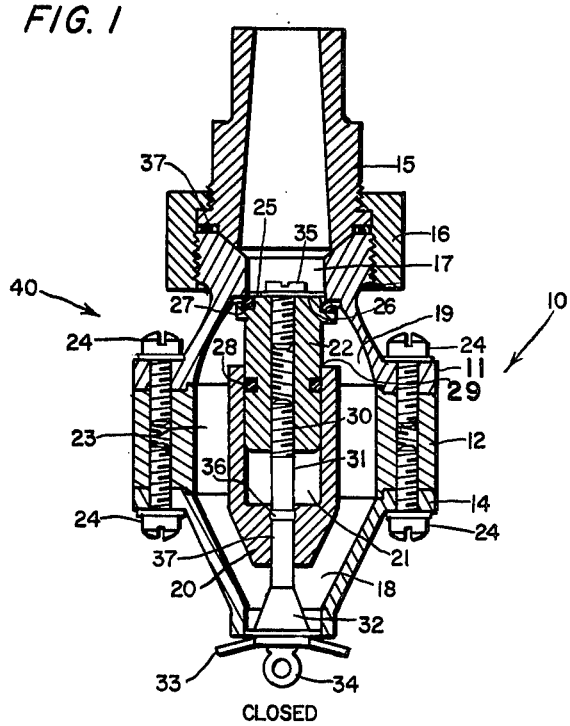
FIG. 1 CLOSED
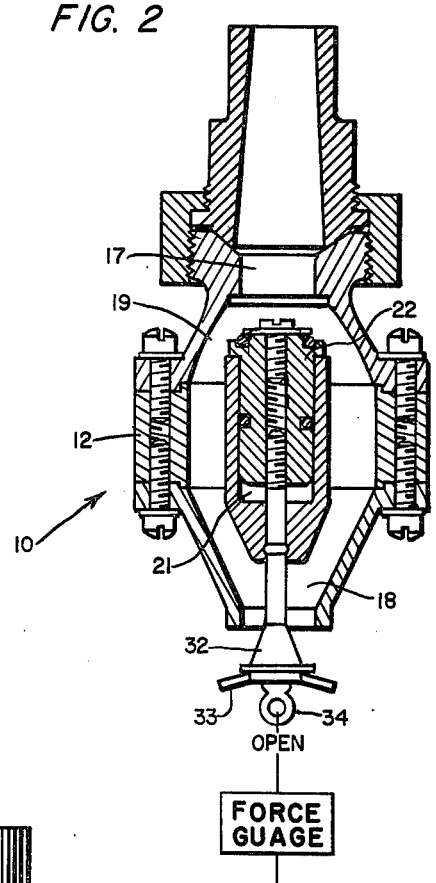
FIG. 2 OPEN
FORCE GUAGE
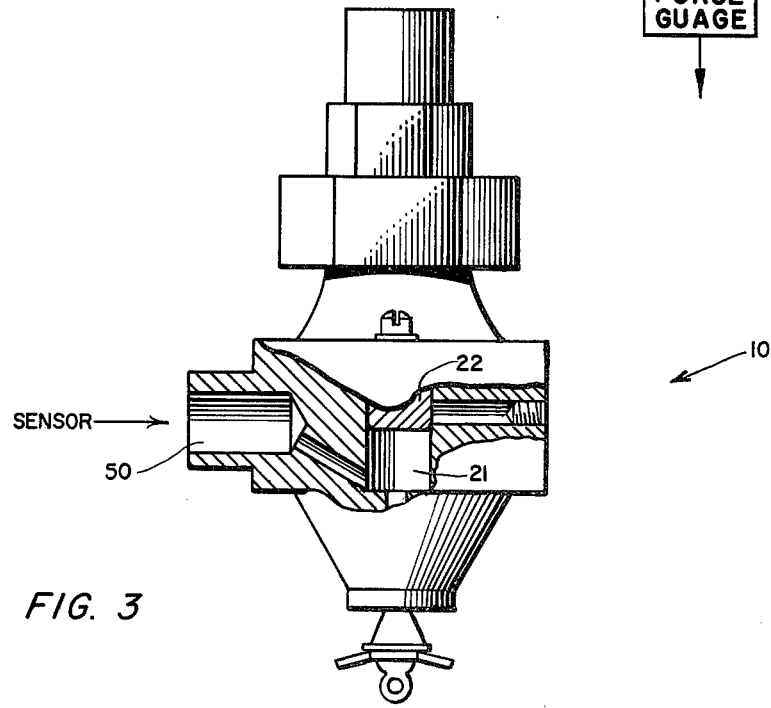
FIG. 3
SENSOR

SPRINKLER VALVE

BACKGROUND OF THE INVENTION

The present invention relates to a sprinkler valve for wet sprinkler systems and more particularly to a sprinkler valve which can be tested for flow without activating the sprinkler system.

Sprinkler systems or fire protection systems incorporating sprinkler head valves are used in various applications and configurations to help control and extinguish fires that may occur. Such fire protection systems commonly utilize a network of sprinkler pipes for conducting a fire extinguishing medium, such as water, to a plurality of automatic sprinklers which are arranged to cover the area protected. Two common types of automatic sprinkler systems are the wet pipe type and the dry pipe type.

In the dry pipe system, the network of sprinkler pipes contain a gas, such as air, rather than the first extinguishing medium. A supply of the first extinguishing medium is connected to the sprinkler system by a dry pipe valve which can be opened automatically upon the occurrence of a first to permit the fire extinguishing medium to enter the sprinkler system and discharge from the sprinkler heads. The dry pipe sprinkler system is normally utilized in unheated areas where the piping may be subjected to freezing temperatures, such as a warehouse.

In wet pipe systems, the sprinkler pipes are filled with a fire extinguishing medium, usually water, and connected to a supply of the medium. Individual sprinkler heads are normally closed but are designed to open in response to a heat activated sensor such as an alloy insert which melts when the ambient temperature reaches a predetermined value, commonly in the neighborhood of 135°-165° F.

The sprinkler head valve of the subject invention is to be used with wet pipe type sprinkler systems where there is water pressure up to and including the sprinkler head valve itself. Aboard ship, such sprinkler systems and valves are located in weapons magazines and other strategic areas. The sprinkler head valves located in such areas are installed in the sprinkler system and then left inactive for long periods of time with no means for testing the valves and assuring that the valves will operate in the event of a fire.

It is a disadvantage of prior art sprinkler valves that, during these periods of inactivity, the sprinkler valves can become corroded shut, clogged or become completely inoperative with no way of ascertaining that the valve has become inoperative. Another disadvantage of such valves is that the only way to test each sprinkler head valve for flow is to activate the sprinkler system and observe which valves are inoperative. In an area such as a weapons magazine, activation of the sprinkler system can result in damage to the components stored in the magazine and thus is to be avoided. The sprinkler valve of the subject invention provides a valve which can be individually tested for flow of the fire extinguishing medium without activating the sprinkler system.

SUMMARY OF THE INVENTION

Accordingly, there is provided in the present invention a sprinkler head valve for wet pipe sprinkler systems which is adapted for flow testing of the valve without activating the sprinkler system.

The valve is constructed with a valve body having a pressurized fluid inlet and a fluid outlet. The inlet and outlet are connected by a flow passage which is positioned in the valve body. The fluid inlet is provided with a supply of pressurized fire extinguishing medium. A cylinder is positioned on a bracket in the flow passage with a piston slidingly mounted in the cylinder so as to form a chamber with the cylinder. A fluid-tight seal is provided between the piston and the cylinder.

The chamber is pressurized by a sensor-controlled fluid pressure line which is connected to the chamber and controls the position of the piston in the chamber to open or close the fluid inlet. Control fluid pressure in the chamber positions the piston in the cylinder so as to close the fluid inlet and prevent the fire extinguishing medium from entering the flow passage. The piston is provided with o-rings to affect a fluid-tight seal between the piston and the fluid inlet.

A stem is mounted in the fluid outlet to project into the flow passage and through an aperture in the cylinder to the piston. The stem is fixedly attached to the piston on a first end and provided on the other end with a stem extension which projects out of the outlet to a position external to the valve. An o-ring is provided between the stem and the cylinder aperture to maintain the sensor-controlled pressure chamber fluid-tight. A liquid deflector and attachment ring for a force gauge are positioned on the stem extension external to the valve outlet.

Individual sprinkler valves of the subject invention can be tested for flow by securing both the control fluid pressure and fire extinguishing medium pressure and exerting a mechanical force on the stem extension to draw the piston into the cylinder and away from the fluid inlet to allow fluid flow through the valve. Once flow through the valve has been ascertained, a mechanical force may be exerted on the stem extension in the opposite direction to return the piston to the valve inlet. The returning mechanical force may be supplied by the control fluid pressure to reseat the piston in the fluid inlet.

OBJECTS OF THE INVENTION

It is an object of the present invention to provide a sprinkler head valve which can be tested for flow without activating the sprinkler system.

Another object of the present invention is to provide a sprinkler valve which has an individual test capability.

Another object of the present invention is to provide a sprinkler valve which is inexpensive and easy to manufacture.

A further object of the present invention is to provide a sprinkler valve which provides for quality control over the operating characteristics of the valve.

A still further object of the present invention is to provide a sprinkler head valve which allows for systematic preventive maintenance and testing of the valve.

A further object of the present invention is to provide a sprinkler head valve which can be functionally tested without flooding the installation area with the fire extinguishing medium.

A still further object of the present invention is to provide a sprinkler head valve which can be visually inspected to determine whether the valve is open or closed.

Other objects, advantages and novel features of the present invention will become apparent from the following detailed description of the invention when considered in conjunction with the drawings.

BRIEF DESCRIPTION OF THE DRAWINGS

A more complete appreciation of the invention and many of the attendant advantages thereof will be readily understood by reference to the following detailed description when considered with the accompanying drawings in which like reference numerals designate like parts throughout the figures and wherein:

FIG. 1 shows a side view in cross-section of the sprinkler head valve of the subject invention in the closed position;

FIG. 2 shows a side view in cross section of the sprinkler head valve in the open position for flow testing; and FIG. 3 shows a side view in partial cross-section of the sprinkler head valve.

DESCRIPTION OF THE PREFERRED EMBODIMENT

Referring to FIGS. 1 and 2, there is illustrated a side view, in cross section, of sprinkler head valve 10. FIG. 1 illustrates the valve in the closed position while FIG. 2 illustrates the valve in the open or test flow position.

As illustrated in FIG. 1, sprinkler head valve 10 is constructed with a hollow valve body 40. The valve body is formed with a hollow valve body intermediate portion 12 to which is attached hollow valve body upper portion 11 and hollow valve body lower portion 14. As can be seen from FIGS. 1 and 2, valve body upper portion 11 and valve body lower portion 14 are attached to valve body intermediate portion 12 by a plurality of threaded fasteners 24 to form valve body 40. It is to be understood that, although threaded fasteners 24 are illustrated in FIGS. 1 and 2, any suitable attachment means may be used to affix the valve body upper and lower portions to the valve body intermediate portion.

As illustrated in FIGS. 1 and 2, valve body upper portion 11 is concentrically hollow and furnished with fluid inlet 17 while valve body lower portion 14 is also concentrically hollow and furnished with fluid outlet 18. When upper portion 11 and lower portion 14 are attached to intermediate portion 12, fluid inlet 17 and fluid outlet 18 are aligned with hollow intermediate portion 12 to form flow passage 19 which can convey fluid from the fluid inlet, through the valve body to the fluid outlet. As depicted in FIGS. 1 and 2, fluid inlet 17 of upper portion 11 is a small diameter aperture which expands to a large diameter to form inner circumferential shoulder 26. The function of inner shoulder 26 is to provide a valve seat for closing of fluid inlet 17.

Sprinkler head valve body 40 is connected to sprinkler system piping 15 by threaded union 16. A gasket 37 is furnished between piping 15 and upper valve body portion 11 to provide a fluid-tight connection. Piping 15 provides a pressurized source of fire extinguishing medium, such as water under 70 p.s.i., for example, to sprinkler valve 10. Again, it should be understood that, although threaded union 16 is illustrated in FIGS. 1 and 2, any suitable attachment means may be used to connect the sprinkler head valve to the sprinkler piping.

Referring to FIG. 1, there is illustrated and enumerated in detail the internal mechanism of sprinkler head valve 10. Flow passage 19 of intermediate portion 12 is provided with a mounting bracket 23 which fixedly attaches cylinder 20 to intermediate portion 12. Bracket 23 is constructed to both rigidly secure cylinder 20 to valve body intermediate portion 12 and also allow unimpeded fluid flow through flow passage 19 from fluid inlet 17 to fluid outlet 18. Cylinder 20 is mounted in valve body intermediate portion 12 so as to axially extend from valve body upper portion 11 to valve body lower portion 14.

Cylinder 20 is furnished with a concentric, blind aperture 29 which is cylindrically shaped and opens to face valve body upper portion 11 and inner shoulder 26. A cylindrical piston 22 is slidingly mounted in aperture 29 so as to form pressure chamber 21 between the piston and the cylinder. Piston 22 is provided with a circumferential groove and o-ring 28 which, in conjunction with cylindrical aperture 29, renders chamber 21 fluid and pressure-tight.

As can be seen by referring further to FIG. 1, piston 22 is positioned in aperture 29 of cylinder 20 so as to partially extend out of cylinder 20 and abut inner shoulder 26 of valve body upper portion 11 and thus close fluid inlet 17. The piston is held against shoulder 26 by pressure in chamber 21. Piston 22 is provided with a forward face 25 in which is positioned a groove and o-ring 27 which seats against inner shoulder 26 to effect a fluid-tight seal in closing fluid inlet 17. O-ring 27 is secured to piston face 25 by a retainer plate/threaded fastener arrangement 35.

Referring now to FIG. 3, there is illustrated a side view, in partial cross-section, of sprinkler head valve 10. The side view of FIG. 3 is obtained by rotating 90° the valve of FIGS. 1 and 2. As can be seen in FIG. 3, sprinkler valve 10 is provided with a control fluid pressure line fitting 50 which opens into pressure chamber 21 to provide a supply of pressurized control fluid, such as air at 225 p.s.i., for example, to the chamber. The pressurized fluid in chamber 21 holds piston 22 against inner shoulder 26 to effectively close fluid inlet 17 and prevent the fire extinguishing medium from flowing from fluid inlet 17, through flow passage 19 to fluid outlet 18.

The control fluid pressure line is provided with a sensor, shown in block diagram, such as a metal alloy insert, which melts when the ambient temperature in the area where the sprinkler valve is mounted reaches a predetermined value, commonly in the neighborhood of 135°–165° F. When a fire occurs in the area where the sprinkler valve and sensor are mounted, the insert melts and releases the pressurized control fluid from fitting 50 and pressure chamber 21. With the depressurization of chamber 21, the pressurized fire extinguishing medium at fluid inlet 17 forces piston 22 into cylinder 20 and away from inner shoulder 26, thus providing for the flow of fire extinguishing medium from fluid inlet 17, through flow passage 19 to fluid outlet 18. From fluid outlet 18 the fire extinguishing medium is discharged to the environment to aid in combating the fire.

Returning now to FIGS. 1 and 2, cylinder 20 is provided with a through aperture 37 which passes from fluid outlet 18 to pressurized chamber 21. An elongated cylindrical stem 31 is slidingly mounted in and projects through aperture 37 from fluid outlet 18 to piston 22 where it is fixedly attached at one end to the piston by threaded fastener 30. Stem 31 is provided with a groove and o-ring 36 which, in conjunction with through aperture 37, effects a fluid and pressure-tight seal for chamber 21.

The stem is also provided at the opposite end with a stem extension 32 which is positioned in fluid outlet 18 and extends through the fluid outlet to a position external to the sprinkler valve. A liquid deflector 33 is mounted on stem extension 32 to deflect or break up the fire extinguishing medium and create a spray of the fire extinguishing medium as it exits fluid outlet 18. An attachment ring 34 for a pull or force gauge is mounted on the stem extension adjacent to the liquid deflector. The attachment ring allows a force gauge to be connected to the stem extension to determine how much mechanical force is required to displace piston 22 from inner shoulder 26 when testing sprinkler valve 10 for flow.

FIG. 1 illustrates the sprinkler valve of the present invention in the closed position. Pressurized fire extinguishing medium is supplied by the sprinkler system to piping 15 and fluid inlet 17. Passage of the fire extinguishing medium from fluid inlet 17, through flow passage 19 to fluid outlet 18 is prevented by piston 22 seating against inner shoulder 26 of fluid inlet 17. Piston 22 is held fluid-tight against inner shoulder 26 by the pressurized control fluid in chamber 21 which is supplied from a source of pressurized control fluid by fitting 50, illustrated in FIG. 3. The pressure supplied to chamber 21 is sufficient to hold piston 22 against inner shoulder 26 and contain the pressurized fire extinguishing medium in fluid inlet 17.

When it is necessary to test sprinkler valve 10 and ascertain whether fluid flow can be obtained through the valve, a containment vessel is positioned under the individual valve to be tested to contain the fire extinguishing medium exiting the valve. The pressurized fire extinguishing medium is secured or shut off to inlet 17 and the control fluid pressure is secured or shut off to chamber 21. A force gauge is attached to attachment ring 34 and a mechanical force is exerted to withdraw piston 22 from inner shoulder 26 and into chamber 21, illustrated in FIG. 2. The force gauge, see FIG. 2 measures the amount of force necessary to displace the piston and this can be compared to both prior and subsequent tests to give a rough indication of both the corrosion taking place in the valve and the operating characteristics of the valve. When flow through the valve has been ascertained, an opposite mechanical force is exerted on stem extension 32 to return piston 22 to inner shoulder 26 and secure flow through the valve. The opposite mechanical force may be exerted by readmitting control fluid pressure to chamber 21 to reseat piston 22 on shoulder 26 prior to admitting fire extinguishing medium to inlet 17.

An added feature of the sprinkler valve is that the position of piston 22 can be visually determined by observing the external position of stem extension 32 in relation to valve body 40. When stem extension 32 is visible external to the valve body then the valve is open. If stem extension 32 is not visible then the valve is closed. The visual observation characteristic is helpful in determining the position of the valves after the sprinkler system has been activated by a fire and then secured after the fire has been extinguished. To aid in observation, stem extension 32 can be provided with a highly visible paint such as international orange or other readily observable color.

It is thus apparent that the disclosed sprinkler head valve for sprinkler systems can be tested for flow without activating the sprinkler system and can be visually inspected to determine whether the valve is open or closed. The sprinkler valve is inexpensive, easy to manufacture and can be functionally tested for flow without flooding the installation area with fire extinguishing medium. The valve allows systematic preventive maintenance and thus provides for quality control over the operating characteristics of the valve.

Many obvious modifications and embodiments of the specific invention, other than those set forth above, will readily come to mind to one skilled in the art having the benefit of the teaching presented in the foregoing description and the accompanying drawings of the subject invention and hence it is to be understood that such modifications are included within the scope of the appended claims.

What is claimed as new and desired to be secured by Letters Patent of the United States is:

1. A sensor controlled valve for a pressurized sprinkler system which allows the valve to be tested for flow without activating the sprinkler system, comprising:
   a valve body;
   an inlet in the body, said inlet introducing pressurized fluid to the valve;
   an outlet in the body;
   a flow passage connecting the inlet and the outlet;
   a cylinder mounted in the flow passage;
   a piston mounted in the cylinder so as to form a fluid pressure chamber with the cylinder, the chamber adapted to receive a control fluid, and the pressure within said chamber being sensor controlled to allow the piston to open and close the inlet;
   a stem mounted in the outlet extending through the cylinder and pressure chamber and connected to the piston for withdrawing the piston from the inlet;
   a stem extension provided to the stem such that the stem extension projects from the outlet outside of the valve body to allow the piston to be withdrawn from the inlet from a position external to the valve.

2. The valve of claim 1 wherein the stem extension is provided with liquid deflection means.

3. The valve of claim 1 wherein the stem extension is provided with force gauge attaching means.

* * * * *